US012020652B2

(12) United States Patent
Jin et al.

(10) Patent No.: US 12,020,652 B2
(45) Date of Patent: Jun. 25, 2024

(54) DISPLAY DEVICE

(71) Applicant: Samsung Display Co., Ltd., Yongin-si (KR)

(72) Inventors: Ja Kyoung Jin, Yongin-si (KR); Yu Chol Kim, Yongin-si (KR); Ji Hye Kim, Yongin-si (KR); Jin Wook Yang, Yongin-si (KR); Seong Oh Yeom, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/365,532

(22) Filed: Jul. 1, 2021

(65) Prior Publication Data

US 2022/0139333 A1 May 5, 2022

(30) Foreign Application Priority Data

Oct. 30, 2020 (KR) ........................ 10-2020-0143499

(51) Int. Cl.
*G09G 3/3291* (2016.01)
*G09G 3/3233* (2016.01)

(52) U.S. Cl.
CPC ......... *G09G 3/3291* (2013.01); *G09G 3/3233* (2013.01); *G09G 2300/0819* (2013.01); *G09G 2300/0842* (2013.01); *G09G 2310/061* (2013.01); *G09G 2310/08* (2013.01); *G09G 2320/0247* (2013.01)

(58) Field of Classification Search
CPC ............... G09G 3/3291; G09G 3/3233; G09G 2300/0819; G09G 2300/0842; G09G 2310/061; G09G 2310/08; G09G 2320/0247
See application file for complete search history.

(56) References Cited

U.S. PATENT DOCUMENTS

| | | | | |
|---|---|---|---|---|
| 8,952,951 | B2 * | 2/2015 | Yoo | G09G 5/00 345/212 |
| 8,957,837 | B2 | 2/2015 | Han | |
| 9,691,325 | B2 * | 6/2017 | Park | G09G 3/3233 |
| 10,283,047 | B2 * | 5/2019 | Shin | G09G 3/3266 |
| 10,777,140 | B2 * | 9/2020 | Kim | G09G 3/3291 |

(Continued)

FOREIGN PATENT DOCUMENTS

| | | |
|---|---|---|
| KR | 10-1162864 B1 | 7/2012 |
| KR | 10-2020-0030415 A | 3/2020 |
| KR | 10-2020-0052618 A | 5/2020 |

*Primary Examiner* — Jeff Piziali
(74) *Attorney, Agent, or Firm* — Lewis Roca Rothgerber Christie LLP

(57) ABSTRACT

A display device includes: a pixel connected to a first scan line, a second scan line, and a data line, and including a light emitting element and a storage capacitor; and a timing controller configured to drive the pixel in a normal mode in which a driving frequency is maintained constant or a frequency variable mode according to a variable frequency signal supplied from outside, wherein in the normal mode, a first electrode voltage of the light emitting element is initialized in response to a data voltage being supplied to the storage capacitor, and wherein in the frequency variable mode, the first electrode voltage of the light emitting element is not initialized in response to the data voltage being supplied to the storage capacitor.

20 Claims, 11 Drawing Sheets

(56) References Cited

U.S. PATENT DOCUMENTS

| | | | | |
|---|---|---|---|---|
| 11,011,116 | B2* | 5/2021 | An | G09G 3/3233 |
| 2009/0051628 | A1* | 2/2009 | Kwon | G09G 3/3233<br>345/77 |
| 2010/0073346 | A1* | 3/2010 | Min | G09G 3/3291<br>345/211 |
| 2010/0188390 | A1* | 7/2010 | Min | G09G 3/3291<br>345/82 |
| 2011/0205250 | A1* | 8/2011 | Yoo | G09G 3/3233<br>345/77 |
| 2011/0210958 | A1* | 9/2011 | Yoo | G09G 3/325<br>345/76 |
| 2011/0216056 | A1* | 9/2011 | Yoo | G09G 3/3233<br>345/212 |
| 2014/0333680 | A1* | 11/2014 | Choi | G09G 3/3258<br>315/307 |
| 2015/0077314 | A1* | 3/2015 | Kim | G09G 3/3233<br>345/76 |
| 2017/0038898 | A1* | 2/2017 | Kim | G06F 3/0446 |
| 2017/0046006 | A1* | 2/2017 | Kim | G06F 3/0412 |
| 2017/0287390 | A1* | 10/2017 | Lee | G09G 3/3233 |
| 2018/0096649 | A1* | 4/2018 | Lee | G09G 3/3291 |
| 2019/0079606 | A1* | 3/2019 | Kim | G09G 3/3233 |
| 2019/0103060 | A1* | 4/2019 | Kang | H01L 27/124 |
| 2019/0164492 | A1* | 5/2019 | Oh | G09G 3/3258 |
| 2020/0051499 | A1* | 2/2020 | Chung | G09G 3/3233 |
| 2020/0143753 | A1 | 5/2020 | Park | |
| 2020/0184902 | A1* | 6/2020 | Kim | G09G 3/3233 |
| 2020/0202779 | A1* | 6/2020 | Chang | G09G 3/20 |
| 2021/0064170 | A1* | 3/2021 | Hwang | G06F 3/0443 |
| 2021/0104195 | A1* | 4/2021 | Choi | G09G 3/3233 |
| 2021/0134215 | A1* | 5/2021 | Chun | G09G 3/3233 |

* cited by examiner

DISPLAY DEVICE

CROSS-REFERENCE TO RELATED APPLICATION

The present application claims priority to and the benefit of Korean Patent Application No. 10-2020-0143499, filed Oct. 30, 2020, which is hereby incorporated by reference for all purposes as if fully set forth herein.

BACKGROUND

1. Field

Aspects of some embodiments of the present invention relate to a display device.

2. Discussion

In recent years, as interest in information displays is increasing, research and development on display devices are continuously conducted.

The above information disclosed in this Background section is only for enhancement of understanding of the background and therefore the information discussed in this Background section does not necessarily constitute prior art.

SUMMARY

Aspects of some embodiments according to the present invention include a display device in which flicker does not occur in a frequency variable mode in which a driving frequency is changed.

A display device according to some embodiments of the present invention may include a pixel connected to a first scan line, a second scan line, and a data line, and including a light emitting element and a storage capacitor; and a timing controller driving the pixel in a normal mode in which a driving frequency is maintained constant or a frequency variable mode according to a variable frequency signal supplied from outside. In the normal mode, a first electrode voltage of the light emitting element is initialized when a data voltage is supplied to the storage capacitor, and in the frequency variable mode, the first electrode voltage of the light emitting element is not initialized when the data voltage is supplied to the storage capacitor.

According to some embodiments, the display device may further include a sensing unit sensing the first electrode voltage of the light emitting element.

According to some embodiments, in the frequency variable mode, the sensing unit may sense the first electrode voltage of the light emitting element in an initial blank period of a first frame in which the driving frequency is changed.

According to some embodiments, the display device may further include a data driver supplying a compensation data voltage for compensating a voltage stored in the storage capacitor to the pixel based on the first electrode voltage of the light emitting element sensed in the frequency variable mode.

According to some embodiments, the pixel may include a first transistor connected between a first driving power source and the light emitting element, and having a gate electrode connected to a first node; a second transistor connected between the data line and the first node, and having a gate electrode connected to the first scan line; and a third transistor connected between a second node to which the first transistor and the light emitting element are coupled and a sensing line, and having a gate electrode connected to the second scan line. The storage capacitor is connected between the first node and the second node.

According to some embodiments, the timing controller may divide one frame into a data writing period and a blank period based on a control signal supplied from the outside, and the initial blank period may be a first blank period after the driving frequency is changed.

According to some embodiments, in the data writing period, the second transistor may be turned on by a first scan signal supplied to the first scan line, and the third transistor may be maintained in a turned-off state.

According to some embodiments, in the first blank period, the third transistor may be turned on by a second scan signal supplied to the second scan line, and the second transistor may be maintained in the turned-off state.

According to some embodiments, the third transistor may supply an initialization voltage to the second node for a predetermined period in response to the second scan signal.

According to some embodiments, in the first blank period, a voltage of the second node may be sensed after the initialization voltage is applied to the second node.

According to some embodiments, in the first blank period, a first electrode of the third transistor may be connected to a switching element through the sensing line, and the switching element may be turned on for the predetermined period.

According to some embodiments, the first electrode of the third transistor may be connected to a sensing capacitor through the sensing line when the switching element is turned off.

A display device according to some embodiments of the present invention may include a pixel connected to a first scan line, a second scan line, and a data line, and including a light emitting element; a timing controller driving the pixel in a normal mode in which a driving frequency is maintained constant or a frequency variable mode according to a variable frequency signal supplied from outside, and dividing one frame into a data writing period and a blank period based on a control signal supplied from the outside; a sensing unit sensing a first electrode voltage of the light emitting element in a first blank period, which is an initial blank period after the driving frequency is changed; and a data driver applying a data voltage compensated by reflecting a sensed first electrode voltage of the light emitting element, to the data line. The pixel may include a first transistor connected between a first driving power source and the light emitting element, and having a gate electrode connected to a first node; a second transistor connected between the data line and the first node, and having a gate electrode connected to the first scan line; a third transistor connected between a second node to which the first transistor and the light emitting element are coupled and a sensing line, and having a gate electrode connected to the second scan line; a fourth transistor connected between the first node and the light emitting element, and having a gate electrode connected to an emission control line; and a storage capacitor connected between the first node and the second node.

According to some embodiments, in the data writing period, the fourth transistor may be turned off.

According to some embodiments, in the first blank period, the fourth transistor may be turned off.

According to some embodiments, in the data writing period, the fourth transistor may be turned off.

According to some embodiments, in the data writing period, the second transistor may be turned on by a first scan signal supplied to the first scan line, and the third transistor may be maintained in a turned-off state.

According to some embodiments, in the first blank period, the third transistor may be turned on by a second scan signal supplied to the second scan line, and the second transistor may be maintained in the turned-off state.

According to some embodiments, the third transistor may supply an initialization voltage to the second node for a predetermined period in response to the second scan signal.

According to some embodiments, in the first blank period, a voltage of the second node may be sensed after the initialization voltage is applied to the second node.

BRIEF DESCRIPTION OF THE DRAWINGS

The accompanying drawings, which are included to provide a further understanding of the inventive concepts, and are incorporated in and constitute a part of this specification, illustrate aspects of some example embodiments of the inventive concepts, and, together with the description, serve to explain principles of the inventive concepts.

DETAILED DESCRIPTION

Figure 1:
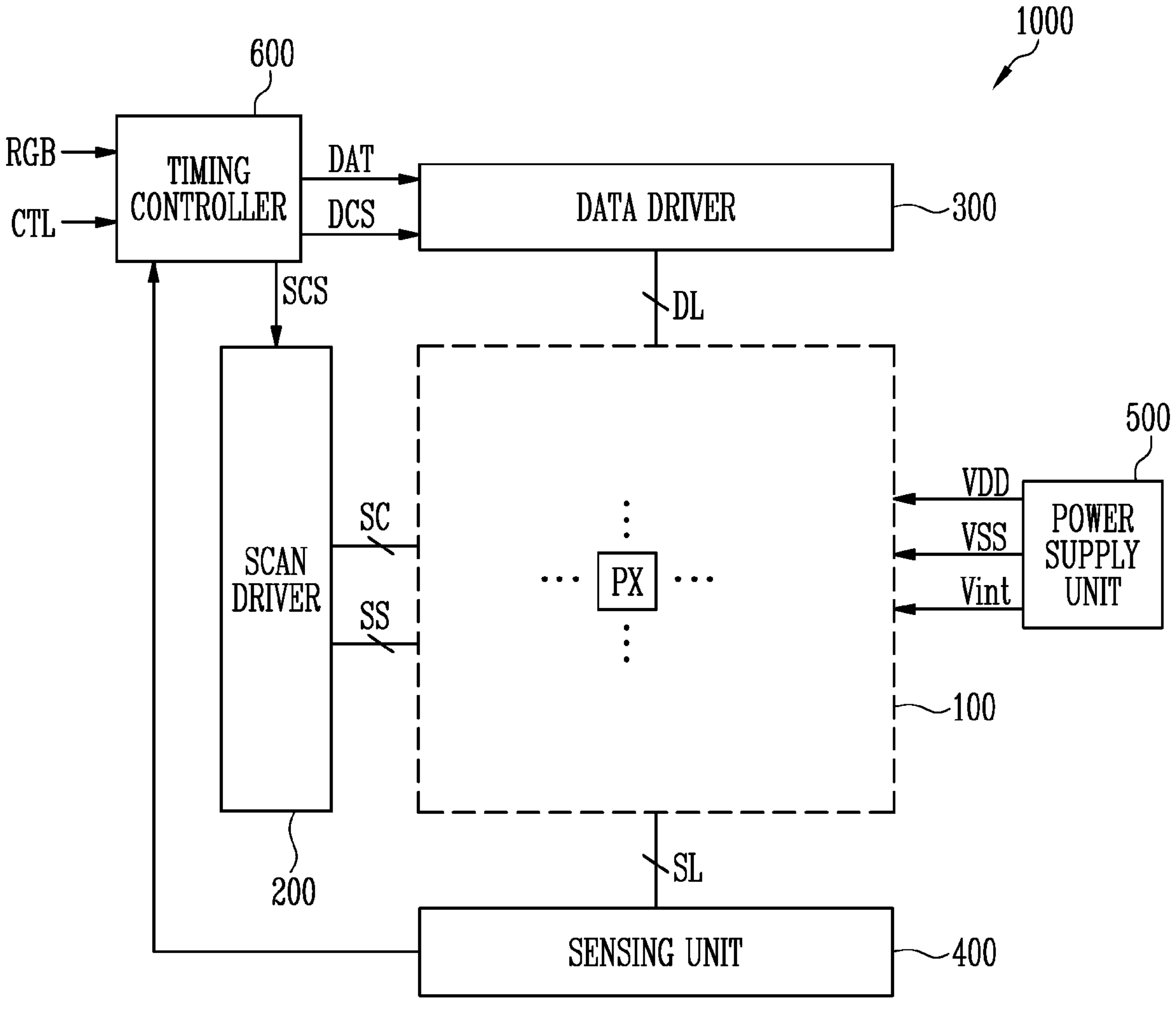
FIG. 1 is a block diagram illustrating a display device according to some embodiments.

As the present invention allows for various changes and numerous embodiments, specific embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

It will be understood that, although the terms "first", "second", etc. may be used herein to describe various elements, these elements should not be limited by these terms. These terms are only used to distinguish one element from another element. For instance, a first element discussed below could be termed a second element without departing from the scope of the present invention. Similarly, the second element could also be termed the first element. In the disclosure, the singular expressions are intended to include the plural expressions as well, unless the context clearly indicates otherwise.

Hereinafter, a display device according to embodiments of the present invention will be described with reference to the drawings related to the embodiments of the present invention.

FIG. 1 is a block diagram illustrating a display device according to some embodiments.

Referring to FIG. 1, a display device 1000 according to some embodiments may include a display unit 100, a scan driver 200, a data driver 300, a sensing unit 400, a power supply unit 500, and a timing controller 600.

The display device 1000 may be a flat panel display device, a flexible display device, a curved display device, a foldable display device, a bendable display device, a stretchable display device, or any other suitable display device according to the design and application of the display device 1000. The display device 1000 may be applied to a transparent display device, a head-mounted display device, a wearable display device, or the like. In addition, the display device 1000 may be applied to various electronic devices such as a smart phone, a tablet, a smart pad, a TV, a monitor, a virtual or augmented reality device, or any other suitable electronic device according to the design and application of the display device 1000.

The display device 1000 may be implemented as a self-light emitting display device including a plurality of self-light emitting elements. For example, the display device 1000 may be an organic light emitting display device including organic light emitting elements, a display device including inorganic light emitting elements, or a display device including light emitting elements composed of a combination of inorganic and organic materials. However, this is an example, and the display device 1000 may be implemented as a liquid crystal display device, a plasma display device, a quantum dot display device, or any other suitable light emitting display device configured to display images according to the design and application of the display device 1000.

The display unit 100 may include a pixel PX (or a plurality of pixels PX) connected to a data line DL, a first scan line SC, a second scan line SS, and a sensing line SL. The display unit 100 may include a plurality of pixels PX connected to corresponding ones from among a plurality of data lines DL, a plurality of first scan lines SC, a plurality of second scan lines SS, and a plurality of sensing lines SL, respectively.

The pixel PX may receive a voltage of a first driving power source VDD (e.g. a high voltage), a voltage of a second driving power source VSS (e.g., a low voltage), and an initialization voltage Vint from outside. The specific configuration of the pixel PX will be described in more detail below with reference to FIG. 2.

Meanwhile, although FIG. 1 shows a configuration in which the first scan line SC and the second scan line SS are connected to the pixel PX as an example, embodiments according to the present invention are not limited thereto. According to some embodiments, one or more emission control lines and the like may be additionally formed on the display unit 100 according to a circuit structure of the pixel PX.

The scan driver 200 may receive a scan control signal SCS from the timing controller 600. In response to the scan control signal SCS, the scan driver 200 may supply a first scan signal to each of the first scan lines SC and may supply a second scan signal to each of the second scan lines SS.

The scan driver 200 may sequentially supply the first scan signal to the first scan lines SC. For example, the first scan signal may be set as a gate-on voltage so that a transistor included in the pixel PX is turned on. Also, the first scan signal may be used to apply a data signal to the pixel PX.

Also, the scan driver 200 may supply the second scan signal to the second scan lines SS. For example, the second scan signal may be set as the gate-on voltage so that the transistor included in the pixel PX is turned on. The second scan signal may be used to sense (or extract) a driving current flowing through the pixel PX or to apply the initialization voltage Vint to the pixel PX. Timings and waveforms at which the first scan signal and the second scan signal are supplied may be set differently according to a data writing period (or active period), a sensing period, a blank period, and the like.

Meanwhile, although FIG. 1 shows a configuration in which one scan driver 200 outputs both the first scan signal and the second scan signal, embodiments according to the present invention are not limited thereto. According to some embodiments, the scan driver 200 may include a first scan driver that supplies the first scan signal to the display unit 100 and a second scan driver that supplies the second scan signal to the display unit 100. That is, the first scan driver and the second scan driver may be implemented as components independent from each other.

The data driver 300 may receive a data control signal DCS from the timing controller 600. The data driver 300 may convert digital image data DAT into an analog data signal (or data voltage) in response to the data control signal DCS and supply the data signal to the data lines DL. That is, the data driver 300 may supply the data signal (or data voltage) to the display unit 100 during the data writing period of each of the pixels PX among one frame period. The data signal may be a data voltage for displaying an effective image, and may be a voltage corresponding to the digital image data DAT.

The sensing unit 400 may receive a voltage and/or current (e.g., a set or predetermined voltage and/or current) from the pixel PX through the sensing lines SL during the sensing period, and generate sensing data in response to the received voltage (e.g., the set or predetermined voltage and/or current). According to some embodiments, the sensing period may be a first blank period of an initial frame after a driving frequency is changed.

The sensing unit 400 may calculate characteristics (for example, a gate-source voltage, mobility characteristics, threshold voltage characteristics, degradation characteristics, and the like) of a light emitting element and/or a driving transistor included in the pixel PX based on the extracted voltage and/or current (e.g., the extracted set or predetermined voltage and/or current), and supply the sensing data corresponding to the calculated characteristics to the timing controller 600. According to some embodiments, when the driving frequency (frame rate) is changed, the sensing unit 400 may sense a voltage of a first electrode of the light emitting element LD (or a voltage of a storage capacitor Cst of FIG. 3) through the pixel PX in the first blank period of the first frame.

In addition, the sensing unit 400 may generate the sensing data including deterioration information of the pixels PX and supply the generated sensing data to the timing controller 600. The timing controller 600 may compensate for the digital image data DAT and/or the data signal based on the sensing data. According to some embodiments, the sensing data may include a voltage stored in the storage capacitor Cst (shown in FIG. 3) connected to a driving transistor T1 (shown in FIG. 3). Accordingly, when the driving frequency (frame rate) is changed, the data driver 300 may supply a compensation data voltage in consideration of the voltage stored in the storage capacitor Cst to the display unit 100 through the data lines DL.

The power supply unit 500 may supply the first driving power source VDD voltage, the second driving power source VSS voltage, and the initialization voltage Vint to the display unit 100 through power source lines. For example, the power source lines may be provided in the display unit 100. Also, the power source lines may be connected to the pixels PX in units of rows, units of columns, or units of blocks.

The first driving power source VDD and the second driving power source VSS may be driving power sources for driving the pixels PX so that the pixels PX emit light. The first driving power source VDD voltage may be a high level voltage provided to an anode of the light emitting element LD included in the pixel PX, and the second driving power source VSS voltage may be a low level voltage provided to a cathode of the light emitting element LD included in the pixel PX.

The initialization voltage Vint may be a voltage for initializing (or resetting) the anode of the light emitting element LD included in the pixel PX. The initialization voltage Vint may have a voltage level different from that of the second driving power source VSS voltage.

The timing controller 600 may receive a control signal CTL and an image signal RGB from an image source such as an external graphic device. The timing controller 600 may generate the data control signal DCS and the scan control signal SCS in response to the control signal CTL supplied from the outside. The data control signal DCS generated by the timing controller 600 may be supplied to the data driver 300, and the scan control signal SCS may be supplied to the scan driver 200. In addition, the timing controller 600 may supply the digital image data DAT in which the image signal RGB supplied from the outside is rearranged to the data driver 300.

According to some embodiments, the timing controller 600 may drive the pixel PX of the display unit 100 in a normal mode in which a driving frequency (frame rate) is maintained constant or in a frequency variable mode in which a frequency is changed according to a variable frequency signal supplied from the outside. In addition, when the driving frequency (frame rate) is changed, the timing controller 600 may divide one frame into the data writing period and the blank period based on the control signal CTL.

The timing controller 600 may provide the digital image data DAT and/or the data signal to the data driver 300 based on the sensing data of the pixels PX provided from the sensing unit 400 in the frequency variable mode. Accordingly, when the driving frequency (frame rate) is changed, the data driver 300 may supply the compensation data voltage in consideration of the voltage stored in the storage capacitor Cst to the display unit 100 through the data lines DL.

Hereinafter, an example of driving the display device when the driving frequency is changed will be described in more detail with reference to FIG. 2.

Figure 2:
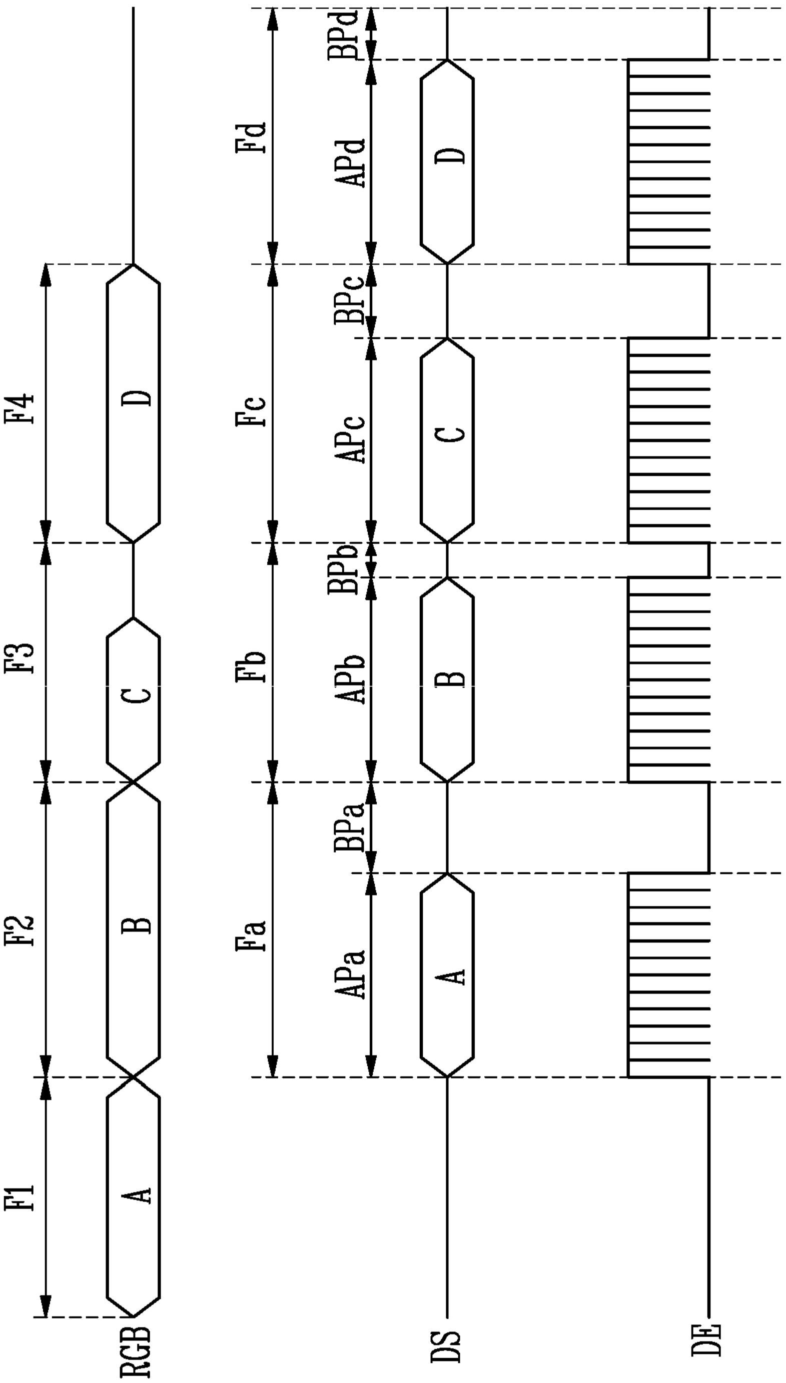
FIG. 2 is a diagram for explaining an example of driving the display device according to an image signal supplied from outside.

FIG. 2 is a diagram for explaining an example of driving the display device according to an image signal supplied from outside (e.g., from an external image signal source, device, or component).

Referring to FIG. 2, the image signal RGB supplied from the outside may be a signal rendered by a graphic processor or the like. The frame rate of the image signal RGB may be changed according to the rendering time of the graphics processor. Hereinafter, the frame rate means a frame frequency, that is, the number of frames transmitted per second (frame per second). The larger the frame rate, the shorter the time and blank period of one frame, and the smaller the frame rate, the longer the time and blank period of one frame.

According to some embodiments, when the frame rate of the image signal RGB changes according to the rendering time of the graphic processor, the frame rate of the display device may also be changed.

The image signal RGB may be signal-processed by the timing controller 600 (shown in FIG. 1), delayed by one frame, and output as a data signal DS (or data voltage) by the data driver 300 (shown in FIG. 1). According to some embodiments, the data signal DS may be output based on a data enable signal DE supplied from the timing controller 600.

The frame rate of the display device may be the same as the frame rate of a frame delayed by one frame of the image signal RGB received from the outside. For example, the frame rate of a frame Fa in which a "A" data signal DS of the display device is output may be the same as the frame rate of a frame F2 in which a "B" image signal RGB is received. The frame rate of a frame Fb in which a "B" data signal DS of the display device is output may be the same as the frame rate of a frame F3 in which a "C" image signal RGB is received.

One frame of the display device may include the data writing period in which the data signal DS is output and the blank period. In each of frames Fa, Fb, Fc, and Fd, time lengths of data writing periods APa, APb, APc, and APd in which "A", "B", "C" and "D" data signals DS are output may be the same.

The time lengths of blank periods BPa, BPb, BPc, and BPd may vary according to the difference between the frame rate of each of the frames Fa, Fb, Fc, and Fd and the data writing periods APa, APb, APc, and APd.

In the example shown in FIG. 2, because the frame rate of the frame Fa in which the "A" data signal DS is output is smaller than the frame rate of the frame Fb in which the "B" data signal DS is output, the length of the blank period BPa may be longer than the length of the blank period BPb. Similarly, for example, the frame rate of the frame Fc in which the "C" data signal DS is output may be shorter than the is frame rate of the frame Fd in which the "D" data signal DS is output, and the length of the blank period BPc may be longer than the length of the blank period BPd.

In this way, even if the frame rate, or the duration of the time period in which the data signal DS is output during a frame, changes irregularly, lengths of the blank periods BPa, BPb, BPc, and BPd of each of the frames Fa, Fb, Fc, and Fd may be controlled. Therefore, image tearing due to a discrepancy between the frame generation of the graphic processor and the frame output of the display device, and an input lag in which a part of the input frame disappears may be improved.

However, when the frame rate is changed, because the length of the blank period per frame is different, and a voltage of the anode of the light emitting element LD (shown in FIG. 3) is not initialized during the blank period, flicker may be recognized in the display device. When the frame rate is changed to an integer multiple, instances of flicker occurring in the display device may be prevented or reduced by constantly (or regularly) initializing a first electrode voltage of the light emitting element LD in the blank period of one frame. However, when the frame rate is changed to a non-integer multiple instead of the integer multiple, because the timing of initializing the first electrode voltage of the light emitting element LD is not constant, the flicker may still be recognized in the display device.

Therefore, according to some embodiments, by not initializing the first electrode voltage of the light emitting element LD, even if the frame rate is changed to a frame rate other than the integer multiple, instances of flicker occurring in the display device may be prevented or reduced. In addition, because the compensation data voltage is applied to the pixel PX after the frame rate is changed, the display device may be implemented with a desired luminance regardless of initialization of the light emitting element LD.

Hereinafter, a pixel of the display device according to some embodiments will be described in more detail with reference to FIGS. 3 to 5.

Figure 3:
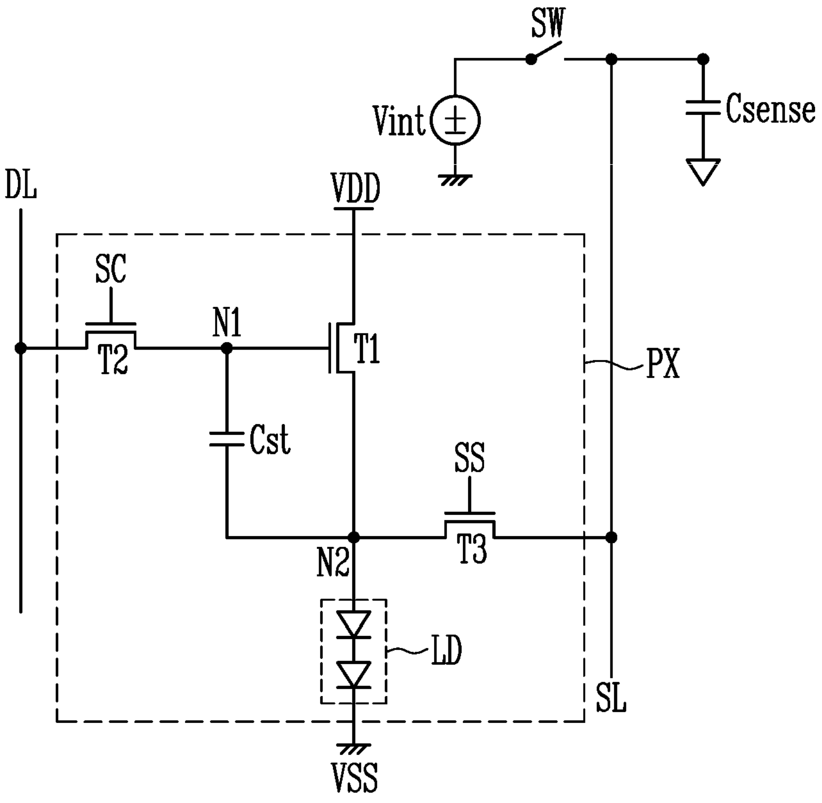
FIG. 3 is a circuit diagram illustrating an example of a pixel included in the display device of FIG. 1.
Figure 4A:
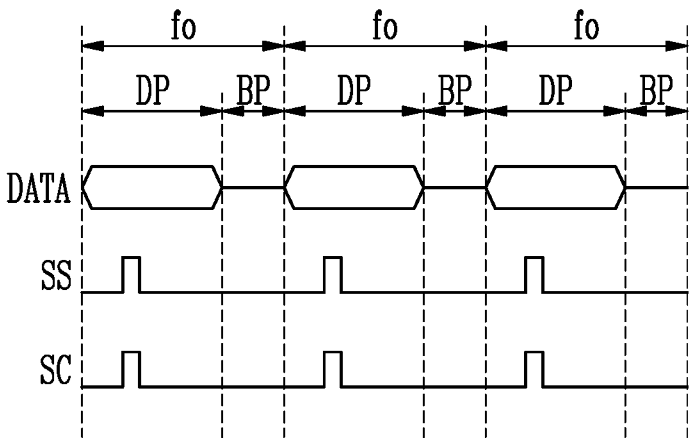
FIGS. 4A and 4B are waveform diagrams illustrating an example of an operation of the pixel of FIG. 3.
Figure 4B:
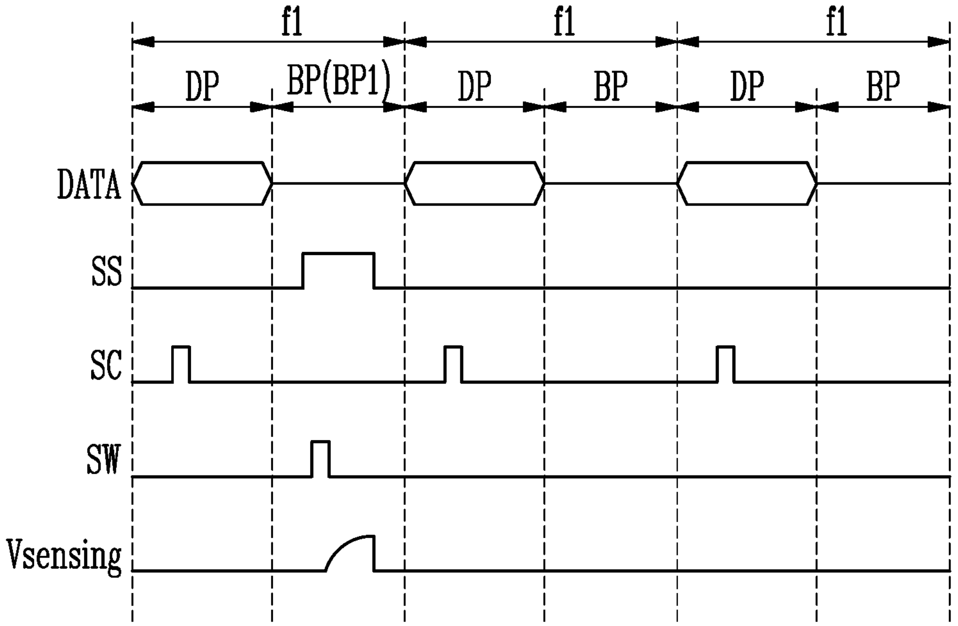

FIG. 3 is a circuit diagram illustrating an example of a pixel included in the display device of FIG. 1. FIGS. 4A and 4B are waveform diagrams illustrating an example of an operation of the pixel of FIG. 3. FIG. 5 is a diagram schematically illustrating a change in a gate-source voltage of a first transistor.

First, referring to FIG. 3, a pixel PX may include a light emitting element LD, a first transistor T1, a second transistor T2, a third transistor T3, and a storage capacitor Cst.

The pixel PX may be connected to an initialization power source that applies an initialization voltage Vint by a switching element SW, and may be connected to a sensing capacitor Csense. In addition, the switching element SW, the initialization power source, and the sensing capacitor Csense may constitute the sensing unit 400 (shown in FIG. 1).

The light emitting element LD may generate light of a luminance (e.g., a set or predetermined luminance) in response to the amount of current supplied from the first transistor T1. The light emitting element LD may include the first electrode connected to a second node N2 and a second electrode connected to a second driving power source VSS. According to some embodiments, the first electrode may be the anode, and the second electrode may be the cathode. According to some embodiments, the first electrode may be the cathode, and the second electrode may be the anode.

According to some embodiments, the light emitting element LD may be an inorganic light emitting element formed of an inorganic material. According to some embodiments, the light emitting element LD may be an organic light emitting diode including an organic light emitting layer. Further, the light emitting element LD may be a light emitting element composed of a combination of inorganic and organic materials.

FIG. 3 shows a shape of the light emitting element LD in which a plurality of inorganic light emitting elements are connected in series between the second driving power source VSS and the second node N2, but embodiments according to the present invention are not limited thereto. According to some embodiments, the light emitting element LD may have a shape in which a plurality of inorganic light emitting elements are connected in parallel and/or in series. According to some embodiments, the pixel PX may further include a parasitic capacitor of the light emitting element LD. The parasitic capacitor may store a voltage difference according to a driving current generated from the first transistor T1. Accordingly, the pixel PX may emit light with a relatively stable luminance during one frame.

A first electrode of the first transistor T1 may be connected to a first driving power source VDD, and a second electrode of the first transistor T1 may be connected to the first electrode (or the second node N2) of the light emitting element LD. A gate electrode of the first transistor T1 may be connected to a first node N1. According to some embodiments, the first electrode may be a drain electrode, and the second electrode may be a source electrode.

The first transistor T1 may control the amount of current flowing through the light emitting element LD in response to a voltage of the first node N1. In this case, the first transistor T1 may be turned on when a voltage (that is, a gate-source voltage) between the first node N1 and the second node N2 is higher than a threshold voltage.

A first electrode of the second transistor T2 may be connected to a data line DL, and a second electrode of the second transistor T2 may be connected to the first node N1 (or the gate electrode of the first transistor T1). A gate electrode of the second transistor T2 may be connected to a first scan line SC. The second transistor T2 may be turned on when a first scan signal (for example, a high level voltage) is supplied to the first scan line SC, so that a data voltage may be transferred from the data line DL to the first node N1.

A first electrode of the third transistor T3 may be connected to a sensing line SL, and a second electrode of the third transistor T3 may be connected to the second node N2 (or the second electrode of the first transistor T1). A gate electrode of the third transistor T3 may be connected to a second scan line SS. The third transistor T3 may be turned on when a second scan signal (for example, the high level voltage) is supplied to the second scan line SS to electrically connect the sensing line SL and the second node N2.

According to some embodiments, when the third transistor T3 is turned on, the initialization voltage Vint may be supplied to the second node N2 through the sensing line SL for a time period (e.g., a set or predetermined time period). Also, when the time period (e.g., the set or predetermined time period) elapses, a voltage of the second node N2 may be sensed through the sensing line SL.

For example, when the frame rate is changed, the switching element SW may be turned on for a time period (e.g., the set or predetermined time period) in the initial blank period (that is, in the first blank period), and the initialization voltage Vint may be supplied to the second node N2 through the sensing line SL and the third transistor T3. Then, the second node N2 may be initialized to the initialization voltage Vint for the time period (e.g., the set or predetermined time period) in the first blank period.

Thereafter, the switching element SW may be turned off and the initialization voltage Vint may not be supplied to the sensing line SL. Accordingly, a current corresponding to a voltage stored in the storage capacitor Cst may be supplied from the first transistor T1 to the second node N2, and a voltage corresponding to the current supplied from the first transistor T1 may be applied to the second node N2. The voltage applied to the second node N2 may be stored in the sensing capacitor Csense, and the sensing unit 400 may generate the sensing data using the voltage stored in the sensing capacitor Csense.

The storage capacitor Cst may be connected between the first node N1 and the second node N2. The storage capacitor Cst may charge a data voltage corresponding to the data signal supplied to the first node N1 during one frame. Accordingly, the storage capacitor Cst may store a voltage corresponding to a voltage difference between the first node N1 and the second node N2. That is, the storage capacitor Cst may store a voltage corresponding to a voltage difference between the gate electrode of the first transistor T1 and the second electrode of the first transistor T1. Whether to turn on or turn off the first transistor T1 may be determined according to the voltage stored in the storage capacitor Cst.

The sensing capacitor Csense may be connected between the second electrode of the third transistor T3 and a ground power source. The sensing capacitor Csense may store a voltage applied to the second node N2 during at least one blank period.

Meanwhile, in the present invention, the circuit structure of the pixel PX is not limited by FIG. 3. For example, the light emitting element LD may be positioned between the first driving power source VDD and the first electrode of the first transistor T1.

Further, in FIG. 3, the transistors are shown as NMOS transistors, but embodiments according to the present invention are not limited thereto. For example, at least one of the first to third transistors T1, T2, or T3 may be implemented as a PMOS transistor.

Referring to FIGS. 4A and 4B, driving of each pixel PX may include a data writing period DP and a blank period BP. In one frame, the blank period BP may be set differently according to the frame rate. FIGS. 4A and 4B show driving waveforms supplied to any one pixel PX for convenience of description.

FIG. 4A shows an operation of the pixel PX when the display device is driven in a normal mode. In addition, FIG. 4A shows an example in which the driving frequency is applied as a fundamental frequency fo in the normal mode. For example, the fundamental frequency fo may be 240 Hz.

In the data writing period DP, the first scan signal may be supplied to the second transistor T2 through the first scan line SC, and a second scan signal may be supplied to the third transistor T3 through the second scan line SS. Also, in the data writing period DP, the switching element SW may be maintained in a turned-on state.

In this case, the second transistor T2 may be turned on to apply the data voltage DATA to the first node N1. Also, the third transistor T3 may be turned on to apply the initialization voltage Vint to the second node N2.

A voltage corresponding to the difference between the data voltage DATA and the initialization voltage Vint may be stored in the storage capacitor Cst. Accordingly, the first transistor T1 may apply the current corresponding to the voltage stored in the storage capacitor Cst to the light emitting element LD. Accordingly, the light emitting element LD may generate light with a luminance (e.g., a set or predetermined luminance).

In the blank period BP, the second transistor T2 and the third transistor T3 may be in a turned-off state. The first transistor T1 may apply a current to the light emitting element LD by the voltage stored in the storage capacitor Cst.

Thereafter, in the data writing period DP of the next frame, the first scan signal and the second scan signal may be supplied to the second transistor T2 and the third transistor T3, respectively. As the second transistor T2 is turned on, the data voltage DATA may be applied to the first node N1, and as the third transistor T3 is turned on, the initialization voltage Vint may be applied to the second node N2. Accordingly, the first electrode voltage of the light emitting element LD connected to the second node N2 may be initialized for each frame.

FIG. 4B shows an operation of the pixel PX of FIG. 3 when the display device is driven in the frequency variable mode. In addition, FIG. 4B shows an operation after the frame rate is changed from the fundamental frequency fo to a first frequency f1. The first frequency f1 may be a value smaller than the fundamental frequency fo.

In the data writing period DP, the second transistor T2 may be turned on by the first scan signal supplied from the first scan line SC to write the data voltage DATA to the first node N1. In this case, because the second scan signal is not applied to the third transistor T3 through the second scan line SS, the third transistor T3 may be maintained in the turned-off state. That is, in the display device according to some embodiments, after the frame rate is changed, the third transistor T3 may be maintained in the turned-off state so that the second node N2, that is, the first electrode of the light emitting element LD is not initialized.

The first transistor T1 may apply the driving current to the light emitting element LD based on the data voltage DATA applied to the first node N1. Accordingly, the light emitting element LD may emit light with a luminance (e.g., a set or predetermined luminance).

After the frame rate is changed from the fundamental frequency fo to the first frequency f1, in the initial blank period (that is, a first blank period BP1), the second transistor T2 may be turned off, and the third The transistor T3 may be turned on by the second scan signal (high level voltage). In this case, the sensing line SL may be connected to the initialization power source by the switching element SW, and the initialization voltage Vint may be applied to the second node N2. Here, the switching element SW may be turned on (or shorted) for a time period (e.g., a set or predetermined time period) during which the second node N2 is initialized.

After the time period (e.g., the set or predetermined time period), when the switching element SW is turned off (or open), the first electrode of the third transistor T3 may be connected to the sensing capacitor Csense through the sensing line SL. That is, the sensing line SL may be connected to the sensing capacitor Csense.

Thereafter, the first transistor T1 may supply the current corresponding to the voltage stored in the storage capacitor Cst to the second node N2, and a sensing voltage Vsensing corresponding to the second node N2 may be stored in the sensing capacitor Csense.

The sensing voltage Vsensing stored in the sensing capacitor Csense may be provided to the sensing unit 400 (shown in FIG. 1). The sensing unit 400 may generate the sensing data using the sensing voltage Vsensing stored in the sensing capacitor Csense, and supply the generated sensing data to the timing controller 600. The timing controller 600 may generate the digital image data DAT to compensate for the voltage stored in the storage capacitor Cst using the sensing data and supply the digital image data DAT to the data driver 300.

In more detail, when the display device is driven in the frequency variable mode and the data voltage DATA is supplied to the pixel PX, the initialization voltage Vint may not be supplied to the second node N2. Accordingly, during a period in which the data voltage DATA is stored in the storage capacitor Cst, the second node N2 may not be maintained at the initialization voltage Vint, and the storage capacitor Cst may not be charged with a desired voltage.

Accordingly, in the frequency variable mode, the display device according to some embodiments may generate the sensing data corresponding to the voltage stored in the storage capacitor Cst during the first blank period BP1, and compensate for the digital image data DAT in response to the sensing data. Accordingly, even if the initialization voltage Vint is not supplied to the second node N2 from the next frame period, an image having the desired luminance may be implemented by the compensated data voltage.

Additionally, according to some embodiments, in the frequency variable mode, data supplied in the first frame may be temporarily stored in the timing controller 600 (shown in FIG. 1) so that the voltage stored in the storage capacitor Cst may be compensated. The timing controller 600 may compare the data temporarily stored during the first blank period BP1 with the sensing data to determine the voltage stored in the storage capacitor Cst, and compensate for the digital image data DAT so that the desired voltage may be stored.

Figure 5:
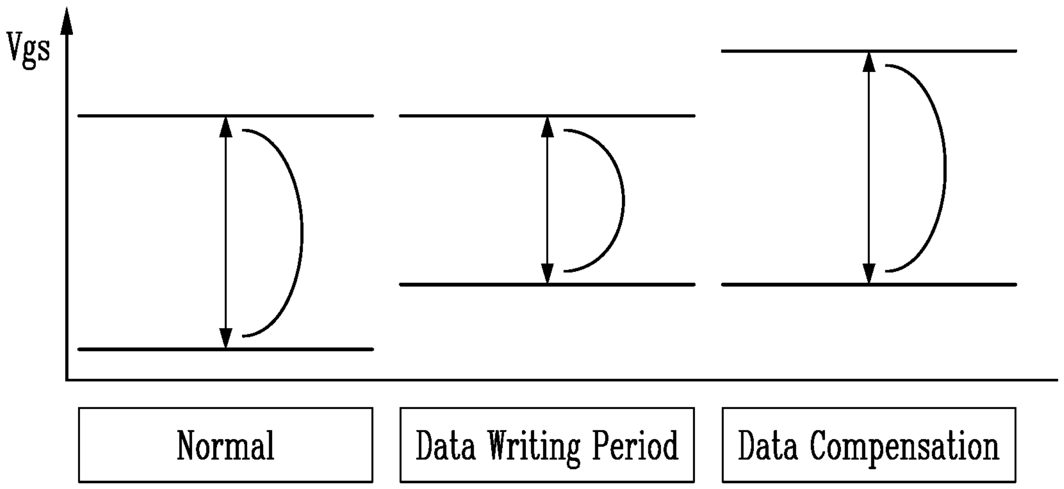
FIG. 5 is a diagram schematically illustrating a change in a gate-source voltage of a first transistor.

FIG. 5 shows a change in a gate-source voltage Vgs of the first transistor T1 to compensate for data.

Referring to FIGS. 3, 4A and 5, when driving in the normal mode, the first electrode voltage of the light emitting element LD connected to the second node N2 may be initialized for each frame.

Accordingly, the voltage stored in the storage capacitor Cst connected between the first node N1 and the second node N2 may be maintained constant. Therefore, the first transistor T1 may uniformly apply the current corresponding to the voltage stored in the storage capacitor Cst to the light emitting element LD.

Thereafter, referring to FIGS. 3, 4B, and 5, after the frame rate is changed, the gate-source voltage Vgs of the first transistor T1 in the data writing period DP will be described.

When the third transistor T3 is turned off, a voltage higher than the initialization voltage Vint may be applied to the second node N2. When the second node N2 is set to the voltage higher than the initialization voltage Vint, the storage capacitor Cst may not be charged with the desired voltage, and thus the desired luminance may not be implemented.

According to some embodiments, in the first blank period BP1 after the frame rate is changed, by turning on the third transistor T3, the initialization voltage may be applied to the second node N2, and the voltage of the second node N2 may be sensed. Accordingly, in order to compensate for the voltage stored in the storage capacitor Cst by reflecting the sensed voltage of the second node N2, the data voltage applied to the first node N1 may be compensated.

That is, because the compensation data voltage is applied to the pixel PX after the frame rate is changed, the display device may be implemented with the desired luminance regardless of the initialization of the light emitting element LD.

In addition, according to some embodiments, instances of flicker occurring in the display device may be prevented or reduced by not initializing the first electrode voltage of the light emitting element LD in the frequency variable mode. Hereinafter, an example in which the frame rate is changed to an integer multiple or non-integer multiple will be described with reference to FIGS. 6 to 9.

FIGS. 6, 7, 8, and 9 are waveform diagrams illustrating an example of an operation of the pixel. FIGS. 6, 7, 8, and 9 will be described together with reference to FIGS. 1 to 5 described above.

Figure 6:
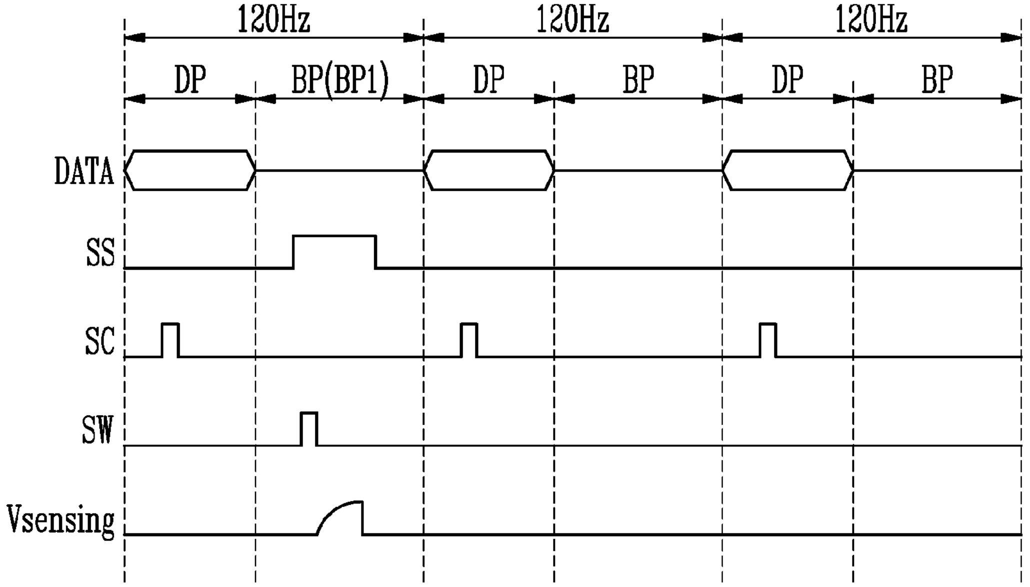
FIGS. 6, 7, 8, and 9 are waveform diagrams illustrating an example of an operation of the pixel.
Figure 7:
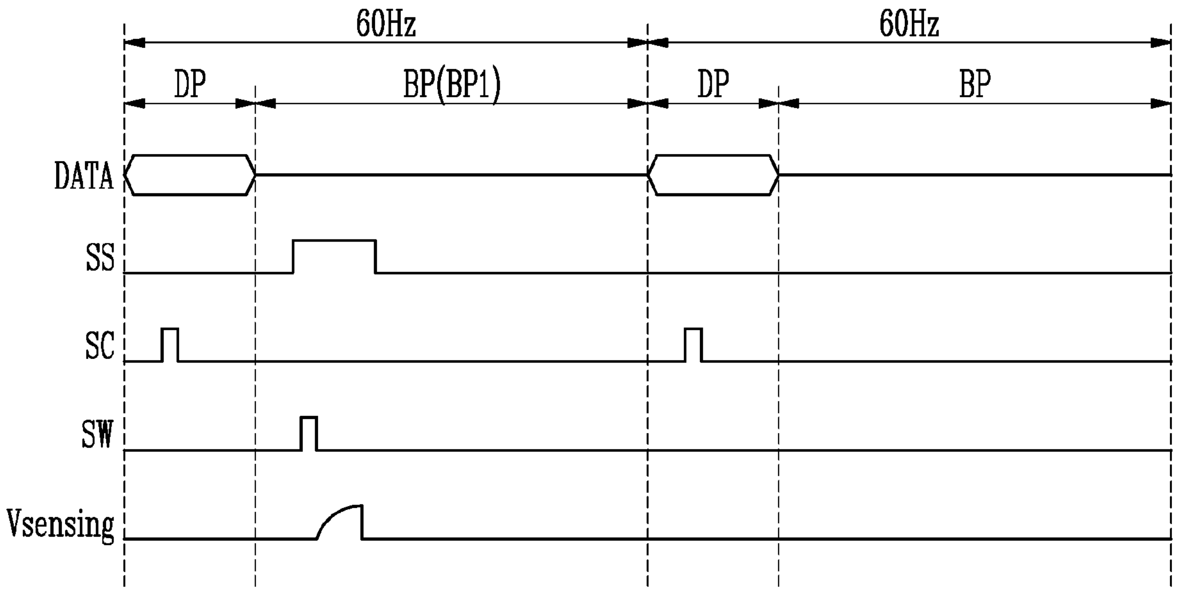

FIG. 6 shows an example in which the driving frequency of the display device is changed to 120 Hz and driven. FIG. 7 shows an example in which the driving frequency of the display device is changed to 60 Hz and driven.

FIGS. 6 and 7 show example waveform diagrams when the fundamental frequency is 240 Hz in the normal mode and the driving frequency is changed to an integer multiple of the fundamental frequency in the frequency variable mode.

Referring to FIGS. 6 and 7, in the data writing period DP of one frame, the second transistor T2 may be turned on by the first scan signal supplied from the first scan line SC so that the data voltage DATA may be written to the first node N1. In this case, because the second scan signal is not applied to the third transistor T3 through the second scan line SS, the third transistor T3 may be maintained in the turned-off state.

According to some embodiments, because the third transistor T3 is maintained in the turned-off state during the data writing period DP, a constant current may be continuously applied to the first electrode of the light emitting element LD. Accordingly, because the first electrode voltage of the light emitting element LD is not initialized, the flicker may not occur in the display device even when the frame rate is changed.

Thereafter, in the first blank period BP1, the third transistor T3 may be turned on and the second transistor T2 may be turned off. In this case, the initialization voltage Vint may be first applied to the third transistor T3 for a time period (e.g., a set or predetermined time period), so that the initialization voltage Vint may be applied to the second node N2. In addition, the sensing unit 400 (shown in FIG. 1) may sense the voltage of the second node N2 through the sensing line SL and supply the sensing data to the timing controller 600 (shown in FIG. 1).

The timing controller 600 may generate the digital image data DAT to compensate for the voltage stored in the storage capacitor Cst using the sensing data and supply the digital image data DAT to the data driver 300. Accordingly, after the frame rate is changed, because the compensation data voltage is applied to the pixel PX, the display device may be implemented with the desired luminance.

Figure 8:
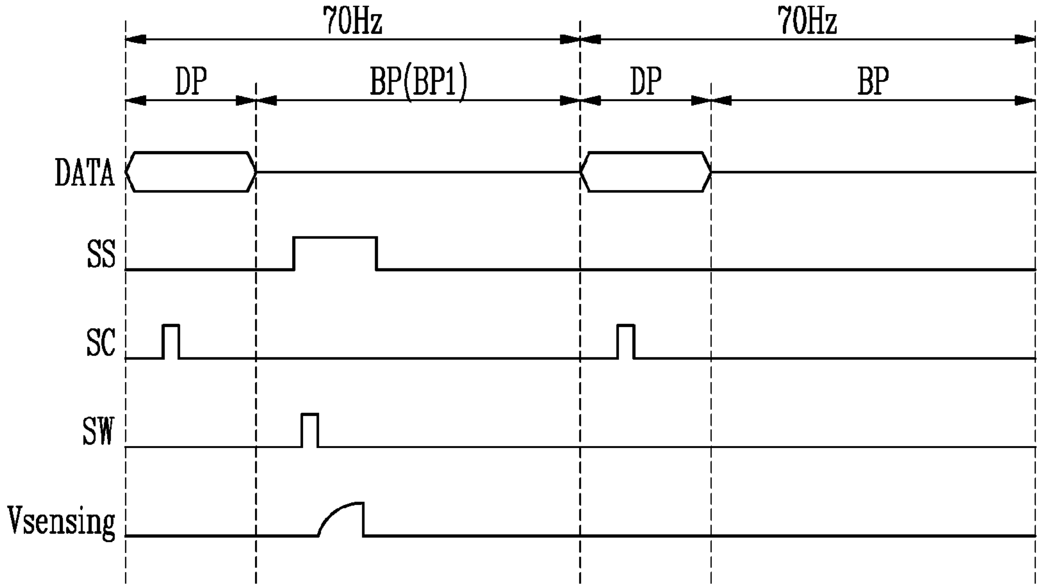
Figure 9:
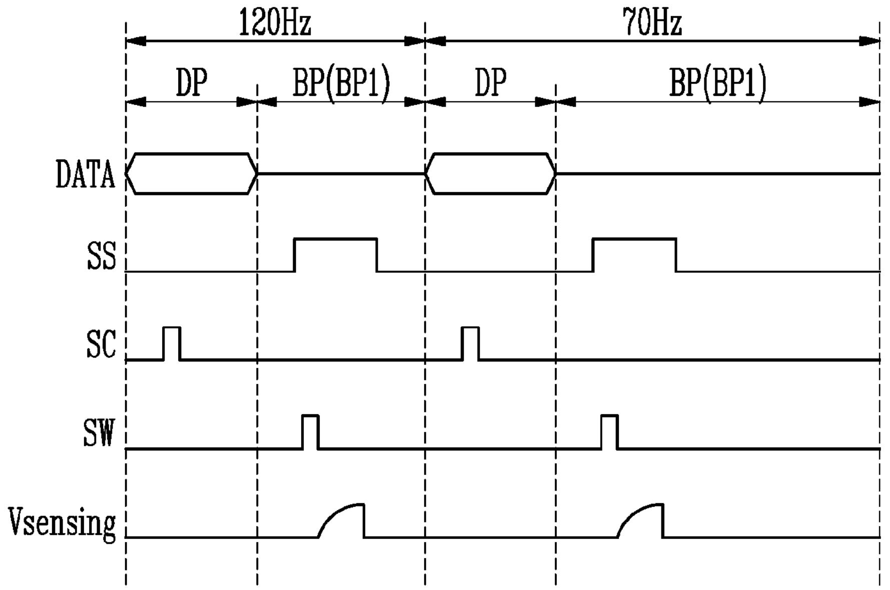

FIG. 8 shows an example in which the driving frequency of the display device is changed to 70 Hz and driven. FIG. 9 shows an example in which the driving frequency of the display device is changed to 120 Hz and then changed to 70 Hz and driven.

FIGS. 8 and 9 show example waveform diagrams when the fundamental frequency is changed to 240 Hz in the normal mode and the driving frequency is changed to a frequency other than an integer multiple of the fundamental frequency in the frequency variable mode.

First, referring to FIG. 8, in the data writing period DP of one frame, the second transistor T2 may be turned on and the third transistor T3 may be maintained in the turned-off state.

Thereafter, in the first blank period BP1, the third transistor T3 may be turned on and the second transistor T2 may be turned off. In this case, the initialization voltage Vint may be first applied to the third transistor T3 for the time period (e.g., the set or predetermined time period), so that the initialization voltage Vint may be applied to the second node N2. In addition, the sensing unit 400 (shown in FIG. 1) may sense the voltage of the second node N2 through the sensing line SL and supply the sensing data to the timing controller 600 (shown in FIG. 1).

The timing controller 600 may generate the digital image data DAT to compensate for the voltage stored in the storage capacitor Cst using the sensing data and supply the digital image data DAT to the data driver 300. Accordingly, after the frame rate is changed, because the compensation data voltage is applied to the pixel PX, the display device may be implemented with the desired luminance.

Referring to FIG. 9, in the data writing period DP of one frame driven at 120 Hz, the second transistor T2 may be turned on and the third transistor T3 may be maintained in the turned-off state.

Thereafter, in the first blank period BP1, the third transistor T3 may be turned on and the second transistor T2 may be turned off. In this case, the initialization voltage Vint may be first applied to the third transistor T3 for the time period (e.g., the set or predetermined time period), so that the initialization voltage Vint may be applied to the second node N2. In addition, the sensing unit 400 (shown in FIG. 1) may sense the voltage of the second node N2 through the sensing line SL.

Also, even in the next frame driven at 70 Hz, the second transistor T2 and the third transistor T3 may operate similarly to those shown in FIG. 8. After the frequency is changed to 70 Hz, the third transistor T3 may be maintained in the turned-off state during the data writing period DP. In addition, in the first blank period BP1, the voltage of the second node N2 may be sensed through the third transistor T3.

As described above, according to some embodiments, whenever the frequency is changed in the frequency variable mode, the data voltage may be corrected to compensate for the voltage stored in the storage capacitor Cst in the first blank period BP1. Accordingly, even if the first electrode voltage of the light emitting element LD is not initialized, an image having the desired luminance may be implemented.

In addition, according to some embodiments, because the voltage of the light emitting element LD is not initialized in the frequency variable mode, instances of flicker or the like occurring in the frequency variable mode may be prevented or reduced.

Hereinafter, an effect of improving the luminance of the display device will be described with reference to FIG. 10.

Figure 10:
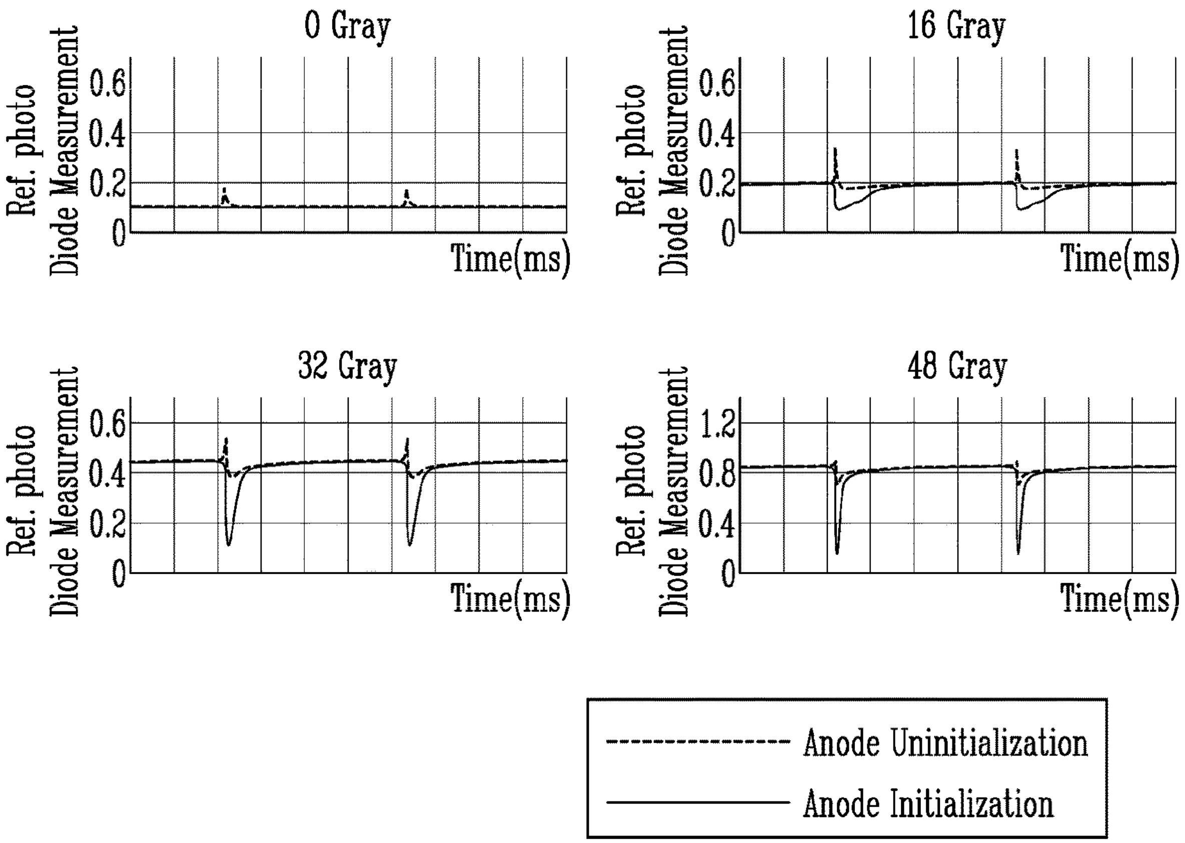
FIG. 10 is an image showing a change in luminance due to uninitialization of a first electrode of a light emitting element.

FIG. 10 is an image showing a change in luminance due to uninitialization of a first electrode of a light emitting element.

Referring to FIG. 10, in the display device according to some embodiments, because the anode (or the first electrode) of the light emitting element LD is not initialized (uninitialization), it can be seen that a change in luminance is reduced compared to the comparative example in which the first electrode of the light emitting element LD is initialized.

That is, according to some embodiments, because the anode voltage of the light emitting element is not initialized in the frequency variable mode, instances of flicker occurring in the display device in the frequency variable mode may be prevented or reduced.

Hereinafter, an example of a display device according to some embodiments will be described with reference to FIGS. 11 to 13B.

Figure 11:
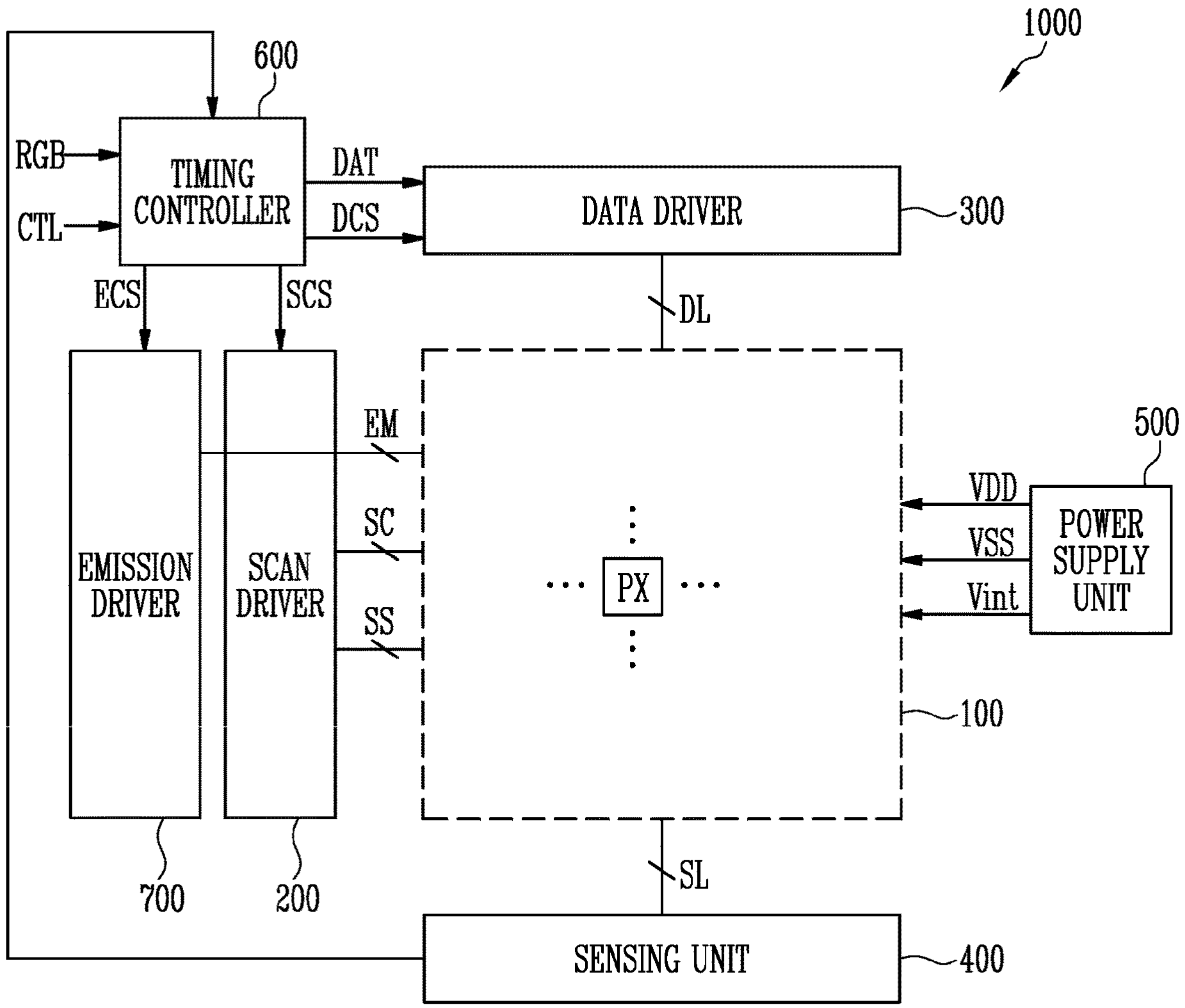
FIG. 11 is a block diagram illustrating a display device according to some embodiments.
Figure 12:
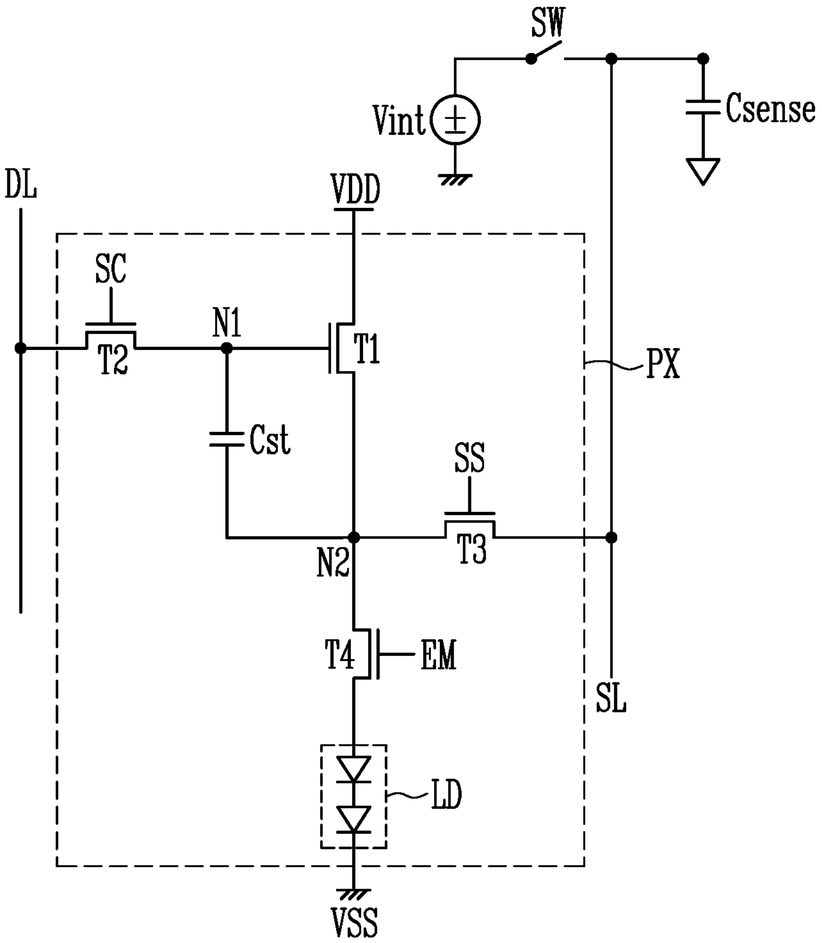
FIG. 12 is a circuit diagram illustrating an example of a pixel included in the display device of FIG. 11.
Figure 13A:
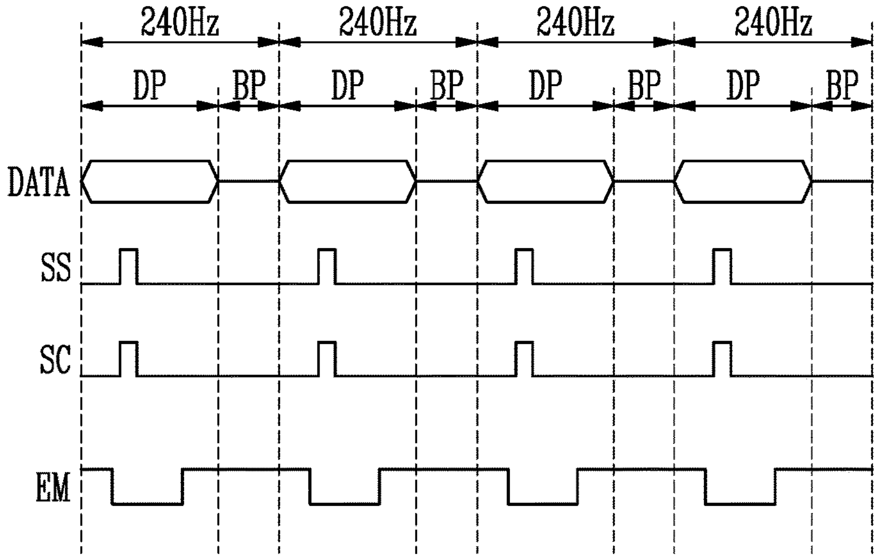
FIGS. 13A and 13B are waveform diagrams illustrating an example of an operation of the pixel of FIG. 12.
Figure 13B:
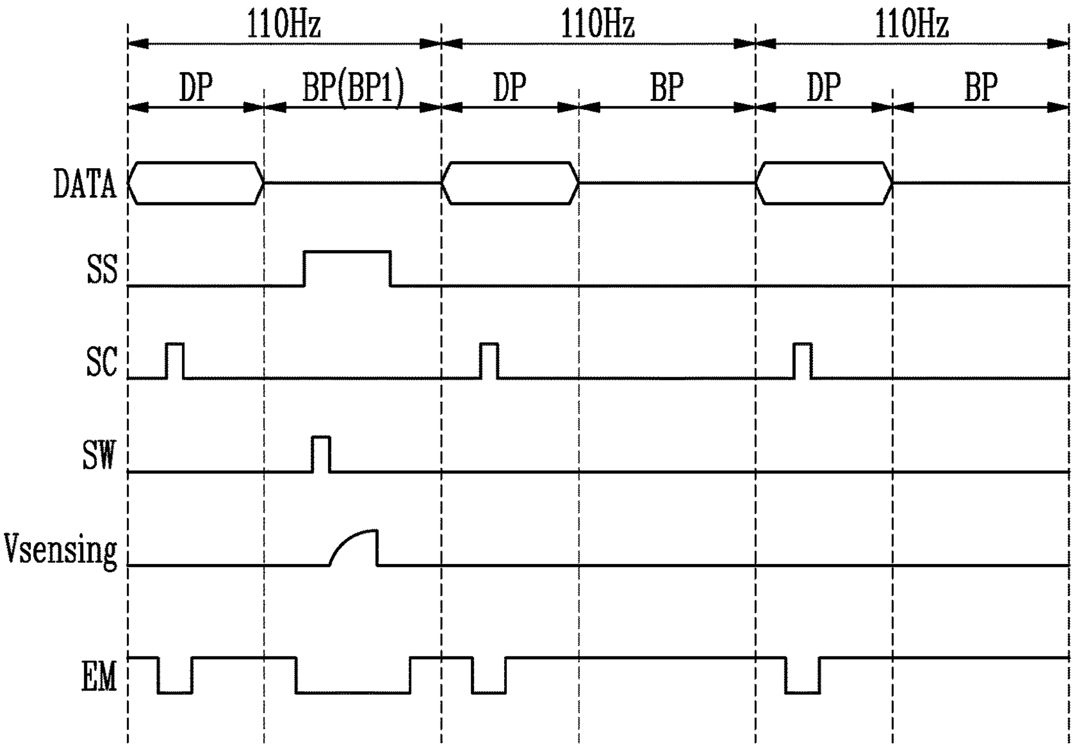

FIG. 11 is a block diagram illustrating a display device according to some embodiments. FIG. 12 is a circuit diagram illustrating an example of a pixel included in the display device of FIG. 11. FIGS. 13A and 13B are waveform diagrams illustrating an example of an operation of the pixel of FIG. 12.

FIGS. 11, 12, 13A, and 13B may be similar to FIGS. 1, 3, 4A, and 4B. Therefore, in the following description, differences will be mainly described in order to avoid redundant descriptions.

Referring to FIG. 11, a display device 1000 according to some embodiments may include a display unit 100, a scan driver 200, a data driver 300, a sensing unit 400, a power supply unit 500, a timing controller 600, and an emission driver 700.

The timing controller 600 may generate a data control signal DCS, a scan control signal SCS, and an emission control signal ECS in response to a control signal CTL supplied from outside. The data control signal DCS generated by the timing controller 600 may be supplied to the data driver 300, and the scan control signal SCS may be supplied to the scan driver 200. In addition, the emission control signal ECS generated by the timing controller 600 may be supplied to the emission driver 700.

According to some embodiments, the timing controller 600 may drive a pixel PX of the display unit 100 in a normal mode in which a driving frequency (frame rate) is maintained constant or in a frequency variable mode in which a frequency is changed according to a variable frequency signal supplied from the outside. In addition, when the driving frequency (frame rate) is changed, the timing controller 600 may divide one frame into a data writing period and a blank period based on the control signal CTL.

In the frequency variable mode, the timing controller 600 may provide digital image data DAT and/or a data signal to the data driver 300 based on sensing data of pixels PX provided from the sensing unit 400. Accordingly, when the driving frequency (frame rate) is changed, the data driver 300 may supply a compensation data voltage in consideration of a voltage stored in a storage capacitor Cst to the display unit 100 through data lines DL.

The emission driver 700 may receive the emission control signal ECS from the timing controller 600. The emission driver 700 may supply an emission signal to each of emission control lines EM in response to the emission control signal ECS. As an example, the emission signal may have a voltage level at which a transistor receiving the emission signal is turned on.

In FIG. 11, the emission driver 700 is shown to be positioned on one side of the scan driver 200, but embodiments according to the present invention are not limited thereto. According to some embodiments, the emission driver 700 may be positioned to face the scan driver 200 with the display unit 100 interposed therebetween.

Referring to FIG. 12, the pixel PX may include a light emitting element LD, a first transistor T1, a second transistor T2, a third transistor T3, a fourth transistor T4, and a storage capacitor Cst.

The pixel PX may be connected to an initialization power source that applies an initialization voltage Vint by a switching element SW, and may be connected to a sensing capacitor Csense. In addition, the switching element SW, the initialization power source, and the sensing capacitor Csense may constitute the sensing unit 400 (shown in FIG. 11).

A first electrode of the first transistor T1 may be connected to a first driving power source VDD, and a second electrode may be connected to a first electrode (or a second node N2) of the light emitting element LD. A gate electrode of the first transistor T1 may be connected to a first node N1. According to some embodiments, the first electrode may be a drain electrode, and the second electrode may be a source electrode.

The first transistor T1 may control the amount of current flowing through the light emitting element LD in response to a voltage of the first node N1. In this case, the first transistor T1 may be turned on when a voltage (that is, a gate-source voltage) between the first node N1 and the second node N2 is higher than a threshold voltage.

A first electrode of the second transistor T2 may be connected to a data line DL, and a second electrode of the second transistor T2 may be connected to the first node N1 (or the gate electrode of the first transistor T1). A gate electrode of the second transistor T2 may be connected to a first scan line SC. The second transistor T2 may be turned on when a first scan signal (for example, a high level voltage) is supplied to the first scan line SC, so that a data voltage may be transferred from the data line DL to the first node N1.

A first electrode of the third transistor T3 may be connected to a sensing line SL, and a second electrode of the third transistor T3 may be connected to the second node N2 (or the second electrode of the first transistor T1). A gate electrode of the third transistor T3 may be connected to a second scan line SS. The third transistor T3 may be turned on when a second scan signal (for example, the high level voltage) is supplied to the second scan line SS to electrically connect the sensing line SL and the second node N2.

A first electrode of the fourth transistor T4 may be connected to the second node N2, and a second electrode of the fourth transistor T4 may be connected to the first electrode of the light emitting element LD. A gate electrode of the fourth transistor T4 may be connected to an emission control line EM. The fourth transistor T4 may be turned on when the emission signal (for example, the high level voltage) is supplied to the emission control line EM to electrically connect the second node N2 and the first electrode of the light emitting element LD.

The storage capacitor Cst may be connected between the first node N1 and the second node N2. The storage capacitor Cst may charge the data voltage corresponding to the data signal supplied to the first node N1 during one frame. Accordingly, the storage capacitor Cst may store a voltage corresponding to a voltage difference between the first node N1 and the second node N2. That is, the storage capacitor Cst may store a voltage corresponding to a voltage difference between the gate electrode of the first transistor T1 and the second electrode of the first transistor T1. Whether to turn on or turn off the first transistor T1 may be determined according to a voltage stored in the storage capacitor Cst.

The sensing capacitor Csense may be connected between the second electrode of the third transistor T3 and a ground power source. The sensing capacitor Csense may store a voltage applied to the second node N2 during at least one blank period.

Referring to FIGS. 13A and 13B, driving of each pixel PX may include a data writing period DP and a blank period BP.

FIGS. 13A and 13B show driving waveforms supplied to any one pixel PX for convenience of description.

FIG. 13A shows an operation of the pixel PX when the display device is driven in the normal mode. For example, the driving frequency in the normal mode may be 240 Hz.

In the data writing period DP, the first scan signal may be supplied to the second transistor T2 through the first scan line SC, and the second scan signal may be supplied to the third transistor T3 through the second scan line SS. Also, the fourth transistor T4 may be turned off to block the connection between the second node N2 and the first electrode of the light emitting element LD during a period (e.g., a set or predetermined period).

In this case, the second transistor T2 may be turned on to apply a data voltage DATA to the first node N1. Also, the third transistor T3 may be turned on to apply the initialization voltage Vint to the second node N2.

A voltage corresponding to the difference between the data voltage DATA and the initialization voltage Vint may be stored in the storage capacitor Cst. In addition, after a period (e.g., a set or predetermined period), the fourth transistor T4 may be turned on by the emission signal supplied from the emission control line EM. Accordingly, the first transistor T1 may apply the current corresponding to the voltage stored in the storage capacitor Cst to the light emitting element LD. Accordingly, the light emitting element LD may generate light with a luminance (e.g., a set or predetermined luminance).

FIG. 13B shows an operation of the pixel PX of FIG. 12 when the display device is driven in the frequency variable mode. For example, in the frequency variable mode, the frequency is changed from 240 Hz, which is the fundamental frequency, to 110 Hz rather than an integer multiple.

In the data writing period DP, the second transistor T2 may be turned on by the first scan signal supplied from the first scan line SC so that the data voltage DATA may be written to the first node N1. In this case, because the second scan signal is not applied to the third transistor T3 through the second scan line SS, the third transistor T3 may be maintained in a turned-off state.

In addition, in the data writing period DP, the fourth transistor T4 may be turned off to block the connection between the second node N2 and the first electrode of the light emitting device LD. Accordingly, when the data voltage DATA is applied to the first node N1, the light emitting element LD may not emit light. On the other hand, because the first transistor T1 may apply a driving current based on the data voltage DATA applied from the first node N1, a voltage of the second node N2 may gradually increase.

In addition, after a period (e.g., a set or predetermined period), the fourth transistor T4 may be turned on by the emission signal supplied from the emission control line EM. Accordingly, the first transistor T1 may apply a current corresponding to the voltage stored in the storage capacitor Cst to the light emitting element LD. Accordingly, the light emitting element LD may generate light with a luminance (e.g., a set or predetermined luminance).

After the frequency is changed to 110 Hz, in a first blank period BP1, the second transistor T2 may be turned off, and the third transistor T3 may be turned on by the second scan signal (high level voltage). In this case, the sensing line SL may be connected to the initialization power source by the switching element SW, and the initialization voltage Vint may be applied to the second node N2. Here, the switching element SW may be turned on (or shorted) for a time (e.g., a set or predetermined time) during which the second node N2 is initialized.

After the time (e.g., the set or predetermined time), when the switching element SW is turned off (or open), the sensing line SL may be connected to the sensing capacitor Csense. Also, the fourth transistor T4 may be turned off. Accordingly, because the connection between the second node N2 and the light emitting element LD may be cut off, the initialization voltage may be applied to the second node N2 by the third transistor T3, and the voltage of the second node N2 may be sensed.

The first transistor T1 may supply the current corresponding to the voltage stored in the storage capacitor Cst to the second node N2, and a sensing voltage Vsensing corresponding to the second node N2 may be stored in the sensing capacitor Csense.

The sensing voltage Vsensing stored in the sensing capacitor Csense may be provided to the sensing unit 400 (shown in FIG. 11). The sensing unit 400 may generate sensing data using the sensing voltage Vsensing stored in the sensing capacitor Csense, and supply the generated sensing data to the timing controller 600.

The timing controller 600 may generate the digital image data DAT to compensate for the voltage stored in the storage capacitor Cst using the sensing data and supply the digital image data DAT to the data driver 300.

In more detail, when the display device is driven in the frequency variable mode, when the data voltage DATA is supplied to the pixel PX, the initialization voltage Vint may not be supplied to the second node N2. Accordingly, during the period in which the data voltage DATA is stored in the storage capacitor Cst, the second node N2 may not be maintained at the initialization voltage Vint, and the storage capacitor Cst may not be charged with a desired voltage.

Accordingly, in the frequency variable mode, the display device according to some embodiments may generate the sensing data corresponding to the voltage stored in the storage capacitor Cst during the first blank period BP1 and compensate for the digital image data DAT in response to the sensing data. Accordingly, even if the initialization voltage Vint is not supplied to the second node N2 from the next frame period, an image having a desired luminance may be implemented by the compensated data voltage.

Additionally, according to some embodiments, in the frequency variable mode, data supplied in the first frame may be temporarily stored in the timing controller 600 (shown in FIG. 1) so that the voltage stored in the storage capacitor Cst may be compensated. The timing controller 600 may compare the data temporarily stored during the first blank period BP1 with the sensing data to determine the voltage stored in the storage capacitor Cst, and compensate for the digital image data DAT so that the desired voltage may be stored.

According to some embodiments, because the anode voltage of the light emitting element is not initialized in the frequency variable mode, instances of flicker is occurring in the display device in the frequency variable mode may be prevented or reduced.

In addition, after the driving frequency is changed, because the compensation data voltage corresponding to the voltage stored in the storage capacitor is applied to the pixel, the pixel may be implemented with the desired luminance even if the anode voltage is not initialized.

Effects of the present invention are not limited to the above-described effects, and more various effects are included within the present specification.

As described above, the optimal embodiments of the invention have been disclosed through the detailed description and the drawings. However, those skilled in the art or those of ordinary skill in the art will appreciate that various modifications and changes are possible without departing from the spirit and scope of the invention as set forth in the claims below.

Therefore, the technical scope of embodiments according to the invention is not limited to the detailed description described in the specification, but should be determined by the claims, and their equivalents.

What is claimed is:

1. A display device comprising:

a pixel connected to a first scan line, a second scan line, and a data line, and including a light emitting element and a storage capacitor;

a timing controller configured to drive the pixel in a normal mode in which a driving frequency is constantly maintained at a first frequency or in a frequency variable mode in which the driving frequency is varied from the first frequency to a second frequency according to a variable frequency signal supplied from outside, wherein each of the normal mode and the frequency variable mode includes one frame divided into alternating periods of a data writing period, during which image data is written, and a blank period, during which image data is not written, based on a control signal supplied from the outside, wherein in the data writing period of the normal mode, a first electrode voltage of the light emitting element is initialized in response to a data voltage being supplied to the storage capacitor, and wherein in the data writing period of the frequency variable mode, the first electrode voltage of the light emitting element is not initialized in response to the data voltage being supplied to the storage capacitor; and a data driver configured to supply a compensation data voltage for compensating a voltage stored in the storage capacitor to the pixel in response to a frame rate changing.

2. The display device of claim 1, further comprising:

a sensor configured to sense the first electrode voltage of the light emitting element.

3. The display device of claim 2, wherein in the frequency variable mode, the sensor is configured to sense the first electrode voltage of the light emitting element in an initial blank period of a first frame in which the driving frequency is changed.

4. The display device of claim 3, a wherein the data driver is configured to supply the compensation data voltage for compensating the voltage stored in the storage capacitor to the pixel based on the first electrode voltage of the light emitting element sensed in the frequency variable mode.

5. The display device of claim 1, wherein the pixel includes:

a first transistor connected between a first driving power source and the light emitting element, and having a gate electrode connected to a first node;

a second transistor connected between the data line and the first node, and having a gate electrode connected to the first scan line; and a third transistor connected between a second node to which the first transistor and the light emitting element are coupled and a sensing line, and having a gate electrode connected to the second scan line, wherein the storage capacitor is connected between the first node and the second node.

6. The display device of claim 5, wherein the timing controller is configured to divide the one frame of the normal mode and the frequency variable mode into the data writing period and the blank period based on the control signal supplied from the outside, and wherein an initial blank period is a first blank period after the driving frequency is changed.

7. The display device of claim 6, wherein in the data writing period, the second transistor is configured to be turned on in response to a first scan signal supplied to the first scan line, and the third transistor is configured to be maintained in a turned-off state.

8. The display device of claim 6, wherein in the first blank period, the third transistor is configured to be turned on by a second scan signal supplied to the second scan line, and the second transistor is configured to be maintained in a turned-off state.

9. The display device of claim 8, wherein the third transistor is configured to supply an initialization voltage to the second node for a period in response to the second scan signal.

10. The display device of claim 9, wherein in the first blank period, a voltage of the second node is sensed after the initialization voltage is applied to the second node.

11. The display device of claim 10, wherein in the first blank period, a first electrode of the third transistor is connected to a switching element through the sensing line, and the switching element is configured to be turned on for the period.

12. The display device of claim 11, wherein the first electrode of the third transistor is connected to a sensing capacitor through the sensing line in response to the switching element being turned off.

13. A display device comprising:

a pixel connected to a first scan line, a second scan line, and a data line, and including a light emitting element;

a timing controller configured to drive the pixel in a normal mode in which a driving frequency is constantly maintained at a first frequency or in a frequency variable mode in which the driving frequency is varied from the first frequency to a second frequency according to a variable frequency signal supplied from outside, and to divide one frame into alternating periods of a data writing period, during which image data is written, and a blank period, during which image data is not written, based on a control signal supplied from the outside;

a sensor configured to sense a first electrode voltage of the light emitting element in a first blank period, which is an initial blank period after the driving frequency is changed;

a data driver configured to apply a data voltage compensated by reflecting a sensed first electrode voltage of the light emitting element to the data line in response to a frame rate changing; and a scan driver configured to apply a first scan signal to the first scan line in the data writing period and apply a second scan signal to the second scan line in the first blank period, wherein the pixel includes:

a first transistor connected between a first driving power source and the light emitting element, and having a gate electrode connected to a first node;

a second transistor connected between the data line and the first node, and having a gate electrode connected to the first scan line;

a third transistor connected between a second node to which the first transistor and the light emitting element are coupled and a sensing line, and having a gate electrode connected to the second scan line;

a fourth transistor connected between the first node and the light emitting element, and having a gate electrode connected to an emission control line; and a storage capacitor connected between the first node and the second node, wherein, when the changed driving frequency is maintained, the scan driver does not supply the second scan signal to the second scan line in blank periods of frames following the first blank period, and wherein the scan driver does not supply the second scan signal to the second scan line in a first data writing period, which is an initial data writing period after the driving frequency is changed.

14. The display device of claim 13, wherein in the data writing period, the fourth transistor is configured to be turned off.

15. The display device of claim 13, wherein in the first blank period, the fourth transistor is configured to be turned off.

16. The display device of claim 15, wherein in the data writing period, the fourth transistor is configured to be turned off.

17. The display device of claim 16, wherein in the data writing period, the second transistor is configured to be turned on in response to the first scan signal, and the third transistor is configured to be maintained in a turned-off state.

18. The display device of claim 17, wherein in the first blank period, the third transistor is configured to be turned on by the second scan signal, and the second transistor is configured to be maintained in the turned-off state.

19. The display device of claim 18, wherein the third transistor is configured to supply an initialization voltage to the second node for a period in response to the second scan signal.

20. The display device of claim 19, wherein in the first blank period, a voltage of the second node is sensed after the initialization voltage is applied to the second node.

* * * * *